Patented June 21, 1932

1,864,063

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

MAGNESIA PROCESS AND MAGNESIUM VALUES RECOVERY

No Drawing.   Application filed April 18, 1929.   Serial No. 356,296.

This invention relates to products containing magnesium compounds and to the process of manufacturing basic magnesium carbonate. It is addressed to the recovery of magnesium values from highly diluted solutions of basic magnesium carbonate.

Basic magnesium carbonate has approximately the formula

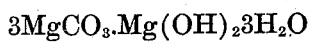

$3MgCO_3.Mg(OH)_2.3H_2O$

It is commonly spoken of as light magnesia, magnesia, magnesium carbonate, etc. and is an extensively used commercial product. Because of its lightness, bulkiness, porosity and certain other physical characteristics, it finds wide use in the manufacture of heat insulating materials.

Basic magnesium carbonate is soluble to a slight extent in water, its solubility decreasing as the temperature of the liquid is increased. Where basic magnesium carbonate is obtained by precipitation from a water solution of magnesium bicarbonate, as with heat, a proportion remains unprecipitated and dissolved in the liquid.

The usual commercial process of manufacturing magnesium carbonate consists essentially in securing a water solution of magnesium bicarbonate at a concentration and temperature at which it is relatively stable and then heating it rapidly with consequent rapid precipitation of basic magnesium carbonate formed by decomposition of the magnesium bicarbonate. The concentration of the raw magnesium bicarbonate liquor prior to heating ordinarily runs approximately from 1.65% to 2%. The temperature of the liquor usually runs approximately from 70° to 80° F. the temperatures in the winter being somewhat lower than those occurring in the summer. At higher concentrations or temperatures, magnesium bicarbonate liquor becomes too unstable to be employed practically and precipitates or crystallizes spontaneously with evolution of $CO_2$.

After raw magnesia liquor has been heated to precipitate the magnesium carbonate, the precipitate is removed by some suitable means such as sedimentation or filtration from the tailings liquor. Analysis of the tailings liquor shows that the amount of basic magnesium carbonate remaining in solution runs from .12% to .17% and that the average amount is about .15%. The above figures are substantiated both by titration tests using methyl orange as an indicator and by soap hardness tests. In addition to basic magnesium carbonate, it is not impossible that other compounds containing magnesium values may be present in the tailings liquor such as minute quantities of unconverted magnesium bicarbonate or some unstable intermediate compound.

In carrying out the magnesia process relatively large amounts of water are used and the volume of tailings is great. Thus, for example, in the manufacture of 10,000 pounds of magnesia, the volume of tailings liquor runs approximately 60,000 gallons. Taking the concentration of the tailings as .15%, the amount of basic magnesium carbonate remaining unprecipitated and dissolved in this quantity of tailings liquor, is 750 pounds. This amounts to 7.5% of the total yield.

Generally, in commercial practice, the tailings and the magnesium values contained therein are thrown away. In certain instances tailings liquor have been returned to the process and reused. This procedure is undesirable because it is necessary to cool the tailings to about 80° F. after the magnesium carbonate has been precipitated at approximately boiling temperature, before the liquid can be reused according to the process. Cooling the large amounts of water employed in commercial practice, is difficult and expensive. Another disadvantage in reusing tailings lies in the fact that the amount of impurities present tends to build up where the same liquid is used over and over again, and this tends to increase contamination in magnesia so manufactured.

It is the object of my invention to afford a practical means for recovering magnesium values from dilute solutions of basic magnesium carbonate and, more particularly, from the tailings liquor of the magnesia process above referred to.

According to my invention dilute solutions of basic magnesium carbonate such as tailings liquor are treated with a metal hydroxide (other than magnesium hydroxide) that is somewhat soluble in water and preferably with the hydroxide of a metal whose carbonate is considerably less soluble than its hydroxide and is also considerably less soluble than basic magnesium carbonate. Calcium hydroxide is a substance which I prefer to use according to my invention and meets the above requirements. Other substances which may also be used are other alkaline earth hydroxides, i. e., strontium hydroxide and barium hydroxide.

In specifying treatment with a metal hydroxide that is somewhat soluble in water, it is meant that the metal hydroxide should be at least approximately as soluble in water as the basic magnesium carbonate dissolved in the tailings liquor and should not be a metallic hydroxide that is practically insoluble in water.

Where dilute solutions of basic magnesium carbonate are treated according to my invention, magnesium hydroxide is formed, which is precipitated from the solution. Where the hydroxide of a metal is used whose carbonate is considerably less soluble than its hydroxide and is also considerably less soluble than magnesium carbonate, a metallic carbonate is precipitated at the same time. For example, where calcium hydroxide is used, a precipitate is thrown from solution consisting of magnesium hydroxide and calcium carbonate. The substances precipitated may be readily recovered by suitable means. For example they may be recovered by sedimentation whereby the precipitate is permitted to settle and the supernatant liquid drawn off or by filtration whereby the liquid containing the precipitate in suspension is filtered to collect the precipitate on the filter cloth. A combination of sedimentation and filtration may also be employed to advantage.

In commercial practice, tailings liquor may be treated according to my invention without cooling, and immediately following the separation of the magnesium carbonate after it has been precipitated with heat. In order to make the precipitation of magnesium values, according to my invention, as complete as possible, it is preferable to add a slight excess of the reagent.

I have found that from 60,000 gallons of tailings, approximately 1,300 pounds of mixed magnesium hydroxide and calcium carbonate are obtainable by the addition of calcium hydroxide, according to my invention. Moreover, for each pound of calcium hydroxide, approximately 1.65 pounds of mixed precipitates are formed, up to the amount of calcium hydroxide required for complete precipitation of the magnesium values contained in solution. Theoretically, the yield of magnesium hydroxide and calcium carbonate, as computed from their molecular weights on the basis of complete precipitation from solution, would be 56.2% calcium carbonate and 43.8% of magnesium hydroxide. As a matter of fact, however, the calcium carbonate, at the temperatures usually applicable in the use of my invention, is somewhat more soluble than the magnesium hydroxide and the composition of the final product, as recovered, consists of magnesium hydroxide and calcium carbonate in very nearly equal proportions by weight.

I regard it as of great advantage that magnesium hydroxide, or magnesium hydroxide mixed with a metallic carbonate, as recovered according to my invention, have valuable and distinctive properties and uses. For example, I have found that they may be used directly in the composition of heat insulation materials such as the insulation materials described in my application for new and improved heat insulating materials and compositions (Ser. No. 356,297 filing date April 18, 1929). When magnesium hydroxide and a metallic carbonate are precipitated simultaneously from a solution of basic magnesium carbonate, the resultant mixture is very intimately commingled and highly flocculated. Mixtures so produced have greater porosity, bulkiness and fineness of particle size, than mixtures produced by mere mechanical mixing and are therefore better adapted to heat insulation purposes. Moreover, if the production of basic magnesium carbonate is desired from the recovered products, this may be readily accomplished by saturating them in water suspension with carbon dioxide under pressure to form a magnesium bicarbonate solution and precipitating basic magnesium carbonate therefrom as in the ordinary magnesia process heretofore described. Thus, for example, a mixture of magnesium hydroxide with calcium carbonate may be treated in water suspension with carbon dioxide under pressure so as to convert the magnesium hydroxide to magnesium bicarbonate, the calcium carbonate filtered off, and basic magnesium carbonate precipitated and recovered in the usual way.

While I have set forth specific applications of my invention, I have endeavored to describe and desire it to be understood that my invention is applicable generally to the recovery of magnesium values from basic magnesium carbonate solution by precipitating therefrom magnesium hydroxide or magnesium hydroxide mixed with a metallic carbonate.

I claim:

1. The process of recovering magnesium values from tailings liquor produced upon precipitating basic magnesium carbonate from a magnesium bicarbonate solution, comprising precipitating therefrom magnesium hydroxide and an alkaline earth carbonate by dissolving therein an alkaline earth metal hydroxide.

2. The process of recovering magnesium values from basic magnesium carbonate solution of concentration .17% to .12% comprising precipitating therefrom magnesium hydroxide and an alkaline earth carbonate by dissolving therein an alkaline earth metal hydroxide.

3. The process of obtaining a mixture of magnesium hydroxide and an insoluble metallic carbonate from basic magnesium carbonate solution comprising precipitating magnesium hydroxide and a metallic carbonate from said solution by adding thereto the hydroxide of a metal whose carbonate is considerably less soluble than its hydroxide and is also considerably less soluble than basic magnesium carbonate, and recovering the precipitate.

4. The process of obtaining a mixture of magnesium hydroxide and an insoluble metallic carbonate from tailings liquor produced upon precipitating basic magnesium carbonate from magnesium bicarbonate solution, comprising precipitation of magnesium hydroxide and a metallic carbonate from said liquor by adding thereto the hydroxide of a metal whose carbonate is considerably less soluble than its hydroxide and is also considerably less soluble than the basic magnesium carbonate, and recovering the precipitate.

5. The process of obtaining a mixture of magnesium hydroxide and calcium carbonate from basic magnesium carbonate solution comprising precipitating magnesium hydroxide and calcium carbonate from said solution by the addition of calcium hydroxide, and recovering the precipitate.

6. The process of obtaining a mixture of magnesium hydroxide and calcium carbonate from tailings liquor produced upon precipitating basic magnesium carbonate from a magnesium bicarbonate solution, comprising precipitating magnesium hydroxide and calcium carbonate from said liquor by the addition of calcium hydroxide, and recovering the precipitate.

7. The process of obtaining magnesium hydroxide from basic magnesium carbonate solution of concentration .17% to .12% comprising mixing with said solution a somewhat soluble metallic hydroxide and recovering the precipitated magnesium hydroxide.

8. The process of treating tailings liquor, produced upon precipitating basic magnesium carbonate from magnesium bicarbonate solution, with a somewhat soluble metallic hydroxide to precipitate magnesium hydroxide.

9. The process of treating tailings liquor, produced upon precipitating basic magnesium carbonate from magnesium bicarbonate solution, with a soluble hydroxide of a metal whose carbonate is considerably less soluble than its hydroxide and also is considerably less soluble than basic magnesium carbonate, to precipitate magnesium hydroxide and a metallic carbonate.

10. The process of obtaining basic magnesium carbonate from a solution of basic magnesium carbonate of concentration .17% to .12% comprising precipitating magnesium hydroxide from said solution by the addition of a somewhat soluble metallic hydroxide, separating the precipitate from the excess mother liquor, treating the precipitate in water suspension with carbon dioxide under pressure to form a solution of magnesium bicarbonate, separating from the solution any matter not dissolved, precipitating basic magnesium carbonate from the magnesium bicarbonate solution, and recovering the precipitate.

11. The process of obtaining basic magnesium carbonate from tailings liquor, produced upon precipitating basic magnesium carbonate from a magnesium bicarbonate solution, comprising precipitating magnesium hydroxide and an insoluble metallic carbonate from said liquor by dissolving in said liquor the hydroxide of a metal whose carbonate is considerably less soluble than its hydroxide and is also considerably less soluble than basic magnesium carbonate, separating the precipitate from the excess mother liquor, treating the precipitate in water suspension with carbon dioxide under pressure to form a solution of magnesium bicarbonate, separating from the solution any matter undissolved, precipitating basic magnesium carbonate from said magnesium bicarbonate solution, and recovering the precipitate.

12. The process of obtaining basic magnesium carbonate from tailings liquor, produced upon precipitating basic magnesium carbonate from a magnesium bicarbonate solution, comprising precipitating magnesium hydroxide and calcium carbonate from said liquor by dissolving in said liquor calcium hydroxide, separating the precipitate from the excess mother liquor, treating the precipitate in water suspension with carbon dioxide under pressure to form a solution of magnesium bicarbonate, separating from the solution the calcium carbonate, precipitating basic magnesium carbonate from said magnesium bicarbonate solution, and recovering the precipitate.

13. The process of obtaining basic magnesium carbonate and a mixture of magnesium hydroxide with an insoluble metallic carbonate, comprising precipitating basic magnesium carbonate from a solution of magnesium bicarbonate, separating the precipitated basic magnesium carbonate from the tailings liquor, precipitating magnesium hydroxide and a metallic carbonate from said tailings liquor by dissolving therein the hydroxide of a metal whose carbonate is considerably less soluble than its hydroxide and whose carbonate is also considerably less soluble than basic magnesium carbonate, and recovering said mixed precipitates of magnesium hydroxide and insoluble metallic carbonate.

14. The process of obtaining basic magnesium carbonate comprising precipitating basic magnesium carbonate from a magnesium bicarbonate solution, separating the precipitated basic magnesium carbonate from the tailings liquor, precipitating magnesium hydroxide from said tailings liquor by mixing therewith a somewhat soluble, metallic hydroxide, separating the precipitate so formed from the excess mother liquor, treating the precipitate in water suspension with carbon dioxide under pressure to form a solution of magnesium bicarbonate, precipitating basic magnesium carbonate from said solution, and recovering the precipitate.

15. The process of recovering magnesium values from basic magnesium carbonate solution, comprising incorporating in said basic magnesium carbonate solution dissolved metal hydroxide selected from the group alkali metal hydroxides and alkaline earth hydroxides to form a precipitate comprising magnesium hydroxide, and recovering the precipitate.

16. The process of recovering magnesium values from tailings liquor produced upon precipitating basic magnesium carbonate from a magnesium bicarbonate solution comprising incorporating in said tailings liquor dissolved metal hydroxide selected from the group alkali metal hydroxides and alkaline earth hydroxides to form a precipitate comprising magnesium hydroxide, and recovering the precipitate.

17. The process of recovering magnesium values from basic magnesium carbonate solution of concentration .17% to .12% comprising incorporating in said basic magnesium carbonate solution dissolved metal hydroxide selected from the group alkali metal hydroxides and alkaline earth hydroxides to form a precipitate comprising magnesium hydroxide, and recovering the precipitate.

In testimony whereof, I have signed my name to this specification.

HAROLD W. GREIDER.